United States Patent
Bertin (10) Patent No.: US 9,253,628 B2
(45) Date of Patent: Feb. 2, 2016

(54) METHOD OF EXCHANGING DATA BETWEEN TWO ELECTRONIC ENTITIES

(75) Inventor: Marc Bertin, La Celle les Bordes (FR)

(73) Assignee: OBERTHUR TECHNOLOGIES, Levallois-Perret (FR)

( * ) Notice: Subject to any disclaimer, the term of this patent is extended or adjusted under 35 U.S.C. 154(b) by 348 days.

(21) Appl. No.: 12/550,066

(22) Filed: Aug. 28, 2009

(65) Prior Publication Data

US 2010/0056047 A1    Mar. 4, 2010

(30) Foreign Application Priority Data

Aug. 28, 2008  (FR) ...................... 08 55771

(51) Int. Cl.

| | |
|---|---|
| H04B 5/02 | (2006.01) |
| H04W 8/22 | (2009.01) |
| H04W 8/24 | (2009.01) |
| H04M 1/725 | (2006.01) |
| H04B 5/00 | (2006.01) |
| H04W 76/02 | (2009.01) |

(52) U.S. Cl.
CPC ............ *H04W 8/245* (2013.01); *H04M 1/7253* (2013.01); *H04M 1/72525* (2013.01); *H04B 5/0031* (2013.01); *H04M 2250/04* (2013.01); *H04W 76/023* (2013.01)

(58) Field of Classification Search
CPC ............ G06K 19/0723–19/0727; H04B 5/00; H04B 5/0012; H04B 5/0025–5/0037; H04B 5/0056–5/02
USPC ...................................................... 455/41.1
See application file for complete search history.

(56) References Cited

U.S. PATENT DOCUMENTS

| | | | | |
|---|---|---|---|---|
| 6,338,435 | B1 * | 1/2002 | Carper ........................ | 235/487 |
| 6,390,374 | B1 * | 5/2002 | Carper et al. ................ | 235/492 |
| 6,644,553 | B1 * | 11/2003 | Ohki et al. .................... | 235/492 |
| 2003/0115371 | A1 * | 6/2003 | Kang et al. .................... | 709/310 |
| 2003/0229723 | A1 * | 12/2003 | Kangas et al. ................ | 709/310 |
| 2004/0122774 | A1 * | 6/2004 | Studd et al. .................... | 705/65 |
| 2004/0152457 | A1 * | 8/2004 | Goldstein et al. ............. | 455/419 |
| 2004/0171375 | A1 * | 9/2004 | Chow-Toun .................. | 455/418 |
| 2004/0203944 | A1 | 10/2004 | Huomo et al. | |
| 2005/0076153 | A1 | 4/2005 | Nedellec | |
| 2005/0222918 | A1 * | 10/2005 | Vanska et al. .................. | 705/26 |
| 2006/0187080 | A1 * | 8/2006 | Slatter ...................... | 340/825.22 |

(Continued)

FOREIGN PATENT DOCUMENTS

| | | |
|---|---|---|
| EP | 1347623 | 9/2003 |
| EP | 1705899 | 9/2006 |

(Continued)

OTHER PUBLICATIONS

French Search Report dated Apr. 7, 2009 from corresponding FR 713512.

*Primary Examiner* — Gennadiy Tsvey (74) *Attorney, Agent, or Firm* — Young & Thompson (57) ABSTRACT

A method of exchanging data between a first electronic entity and a second electronic entity includes the following steps:
- initiating (E400) communication between the first electronic entity and the second electronic entity subsequently to bringing the first and second electronic entities closer together;
- in consequence of the initiation, transmitting (E415) an application from the second electronic entity to the first electronic entity;
- storing (E416) the application in the first electronic entity.

23 Claims, 3 Drawing Sheets

(56) References Cited

U.S. PATENT DOCUMENTS

| | | | |
|---|---|---|---|
| 2006/0265329 A1* | 11/2006 | Hug | 705/50 |
| 2008/0157927 A1* | 7/2008 | Soppera et al. | 340/10.1 |
| 2009/0023476 A1* | 1/2009 | Saarisalo et al. | 455/561 |
| 2009/0119754 A1* | 5/2009 | Schubert | 726/4 |
| 2009/0228719 A1* | 9/2009 | Almgren et al. | 713/193 |

FOREIGN PATENT DOCUMENTS

| | | | |
|---|---|---|---|
| EP | 1876561 A2 | | 1/2008 |
| FR | 2832888 | | 5/2003 |
| JP | 2004164261 A | * | 6/2004 |
| WO | 2006/115842 | | 11/2006 |
| WO | 2007/121791 | | 11/2007 |

* cited by examiner

METHOD OF EXCHANGING DATA BETWEEN TWO ELECTRONIC ENTITIES

BACKGROUND OF THE INVENTION

1. Field of the Invention

The present invention concerns a method for exchange of data between two electronic entities.

2. Description of the Related Art

In the framework of the exchange of data between two electronic entities (which data can be represented in the form of electrical signals in these electronic entities, for example in memories carried by these electronic entities), it has been proposed in particular to implement short range communication (also known as near field communication (NFC)), as described in patent application WO 2007/121 791. The expression short range generally refers to a range of less than 1 m, for example a range of the order of 50 cm, or even 20 cm.

The RFID technology is frequently used to provide such short range communication, and consists in providing a remote power feed by means of a reader to an electronic circuit (for example carried by a "tag", but possibly also by any other object, for example a mobile telephone) which can then communicate with the reader and transmit to it data intended in particular (in the most standard uses of this technology) to identify the product or the person bearing the tag.

Although the limitation of the interaction between the reader and the electronic circuit to the near field generated by the reader (which is in practice a magnetic field) might initially seem problematic, it is to the contrary seen as an advantage of this technology, because communication is initiated by bringing the electronic circuit and the reader close together and thus, typically, stems from an intentional action on the part of the bearer of the electronic circuit.

The patent application WO 2006/115 842 describes a use of this type, for example.

At present, each electronic circuit designed to use the RFID technology is designed with a particular object (i.e. with a view to a particular service) and in that context holds only data relating to the service concerned (for example the code associated with the user's account in the aforementioned document WO 2006/115 842). If the electronic circuit is carried by a telephone, the data relating to the service is thus stored in a memory of the telephone, for example. This solution is lacking in flexibility, however, and for example obliges a user to obtain in advance a plurality of tags each configured to work with each service that they wish to enjoy. Generally speaking it is impossible to access services for which the electronic circuit is not configured.

SUMMARY OF THE INVENTION

To improve on this state of affairs, the invention proposes a method of exchanging data between a first electronic entity and a second electronic entity, characterized by the following steps:
  initiating communication between the first electronic entity and the second electronic entity subsequently to bringing the first and second electronic entities closer together;
  in consequence of said initiation, transmitting an application from the second electronic entity to the first electronic entity;
  storing said application in the first electronic entity.

Thus there is provision for automatically installing (with installation possibly monitored by the user) of a process for storing an application that enables access to functions associated with the second electronic entity (the reader in the examples given hereinafter), even though there is originally no provision for this in the first electronic entity (mobile object).

For example, the step of initiating communication in practice comprises the following steps:
  remote power feeding of the first electronic entity by the second electronic entity;
  sending a communication set-up message from the first electronic entity to the second electronic entity.

There can also be a step, executed in consequence of the initiation and prior to the transmission of the application, of verifying the presence of said application in a memory of the first electronic entity. Transmission is then implemented only if necessary, when the application is not present in the first electronic entity.

In a first embodiment, the verification step comprises the following steps:
  the second electronic entity sending the first electronic entity a command designating said application;
  searching a memory of the first electronic entity for said application.

In a second embodiment, the verification step comprises the following steps:
  the first electronic entity sending a list of applications present in a memory of the first electronic entity;
  the second electronic entity determining the presence of said application in said list.

There can further be the following steps, executed as a consequence of the initiation and prior to the transmission of the application:
  displaying on the first electronic entity information indicating transmission;
  awaiting validation;
  transmitting the application in the case of validation.

The process can also comprise a step of the first electronic entity preparing a request for loading of said application, in which case execution of the preparation step can be conditional on receiving authorization of a user.

The above two solutions enable the user to retain control over storage of the application despite the automatic launching of the process.

The application obtained by the loading process is used for example during exchanges between the first electronic entity and the second electronic entity.

In this context, the following steps can be implemented:
  the first electronic entity executing the application in order to determine a response;
  the first electronic entity sending the response to the second electronic entity.

The transmission of the application and the sending of the response are both effected in the examples described here by communication between short range communication means respectively equipping the first and second electronic entities, which constitutes a particularly advantageous embodiment.

Alternatively, the transmission of the application could nevertheless be obtained by communication between high throughput wireless (i.e. contactless) interfaces of the first and second electronic entities, such as WUSB or BLUETOOTH interfaces. These interfaces are generally separate from the short range, here NFC, interface.

The application is thus exchanged quickly between the electronic entities.

In this context, the application relates to the second electronic entity (the reader in the following examples) since it participates in effecting exchanges between the two electronic entities. The application could nevertheless alternatively have no link with these exchanges; as such, it could for example be a question of an application the execution of which is effected autonomously in the first electronic entity, as in the case of a game.

The first electronic entity is a portable (or pocket) electronic entity, for example, such as a mobile telephone or a portable information medium (of the USB key type) and the communication is short range wireless communication.

BRIEF DESCRIPTION OF THE DRAWING FIGURES

Other features and advantages of the invention will become more apparent in the light of the following description, given with reference to the appended drawings, in which.

DETAILED DESCRIPTION OF THE INVENTION

Figure 1:
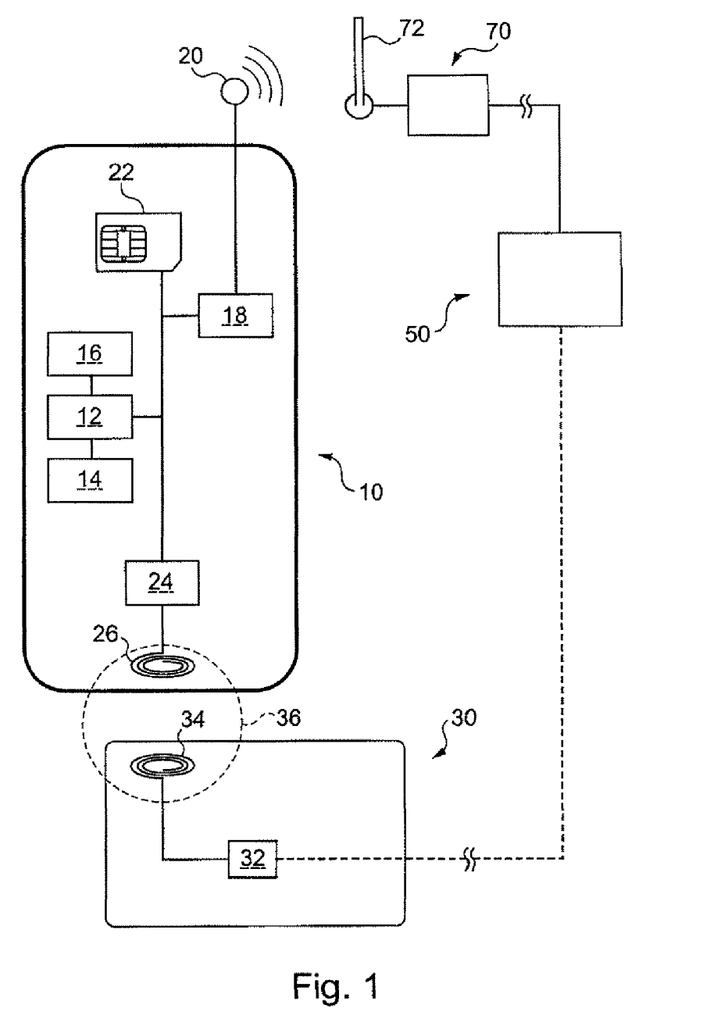
FIG. 1 represents one possible context for implementation of the invention.

FIG. 1 represents one example of a context in which the invention can be implemented.

Such a context includes in particular a portable object 10 (here a mobile telephone) and a reader 30.

The mobile telephone 10 and the reader 30 can exchange data via short range communication (for example NFC) means.

Those short range communication means include in particular an NFC module 24 cooperating (for example via a bus) with a microprocessor 12 of the mobile telephone and connected to an NFC antenna 26 also carried by the mobile telephone 10.

The reader 30 also includes an antenna 34 through which a current flows under the control of a control module 32 so as to generate a magnetic field 36 for supplying power to and communicating with objects situated in the vicinity of the reader 30 (generally in an area extending to less than one meter from the reader, for example to less than approximately 20 cm therefrom, the range being in practice from 1 cm to 10 cm with the technologies widely used at present).

As already indicated, the mobile telephone 10 includes a microprocessor 12 adapted to manage the various functions of the mobile telephone 10, in particular the interface with the user of the mobile telephone 10 (for example by means of a keypad and a screen, not shown). To this end in particular, a read-only memory 16 and a random-access memory 14 are associated with the microprocessor 12.

The read-only memory 16 stores in particular sequences of instructions intended to be executed by the microprocessor 12 in order to implement methods within the mobile telephone 10, in particular the methods proposed by the invention and described hereinafter.

The random-access memory 14 stores parameters or instructions necessary for the execution of the methods mentioned above.

Note further that, as well as or instead of one of the memories 14, 16, there can be provided a non-volatile rewritable memory for storing some of the data or instructions mentioned above.

The mobile telephone 10 finally includes a cellular telecommunications module 18 adapted to exchange data (which can represent the voice of a speaker, for example, but can equally be data or instructions sent to the microprocessor 12, for example) with a base station 70 of a cellular telephone network (in particular via an antenna 20 with which the mobile telephone 10 is equipped and an antenna 72 of the base station).

The mobile telephone 10 finally includes a cellular telecommunications module 18 adapted to exchange data (which can represent the voice of a speaker, for example, but can equally be data or instructions sent to the microprocessor 12, for example) with a base station 70 of a cellular telephone network (in particular via an antenna with which the mobile telephone 10 is equipped and an antenna 72 of the base station).

A server 50 stores in particular applications intended for the mobile telephone 10 in the framework of its exchanges with the reader 30, as explained hereinafter. In the embodiment considered here, this server 50 is connected to the reader 30 or to the base station 70 (and in practice possibly to both these elements), for example by means of cable connections, possibly via the Internet.

Figure 2:
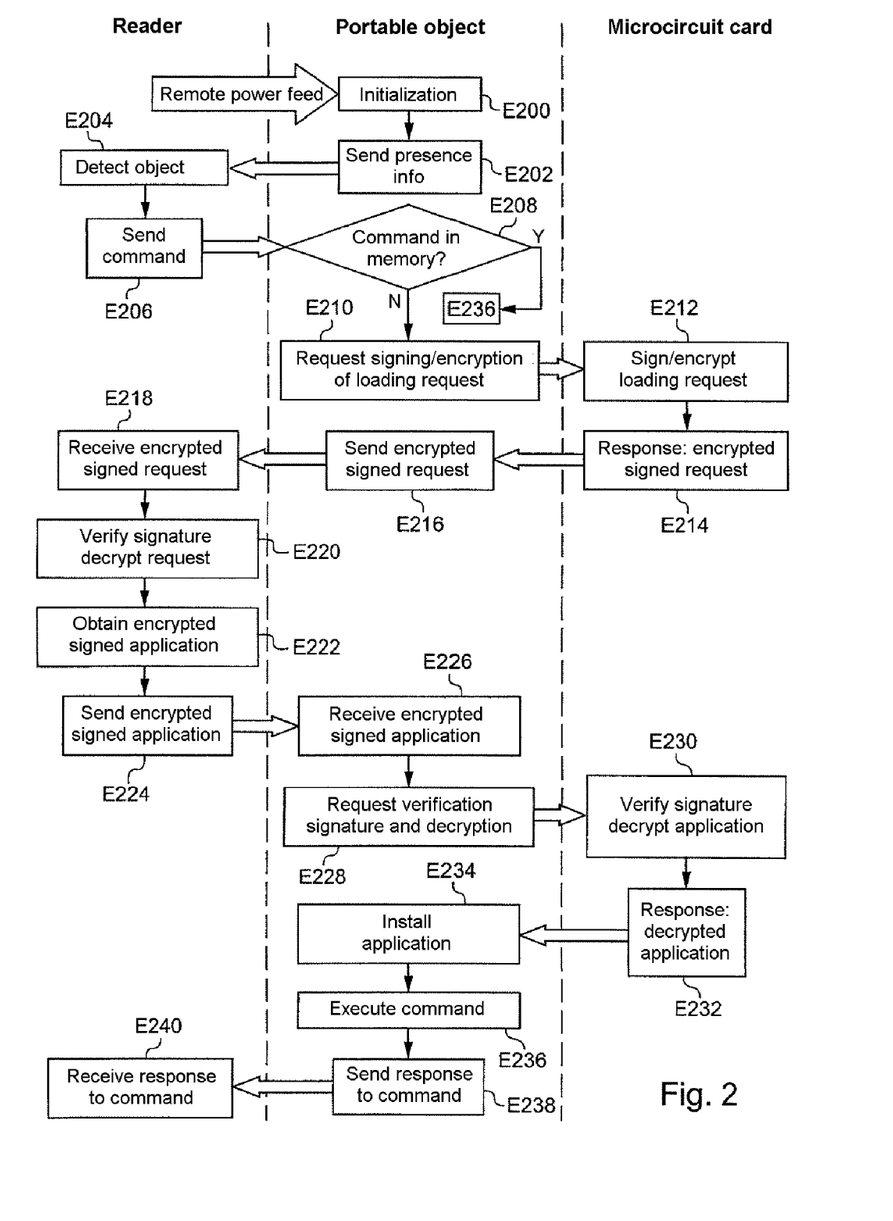
FIG. 2 represents the execution of exchanges between the devices of FIG. 1 in a first embodiment of the invention.

There is described now with reference to FIG. 2 a first example of a method for exchanging data between the various elements described hereinabove in accordance with the teachings of the invention.

This method is used after the portable object 10 (here a mobile telephone, as already indicated) is brought near the reader 30 (here to within less than 20 cm of it, as indicated above), which normally corresponds to the user of the mobile telephone 10 wishing to use functions associated with this reader 30.

Because the telephone 10 and the reader 30 have been brought close together, the telephone 10 (and in particular its NFC antenna 26) enters the magnetic field 36 generated by the reader 30, which instigates a remote power feed to the module 24 and consequently its initialization in the step E200.

Note that the NFC module 24 with which the mobile telephone 10 is equipped can alternatively be supplied with power by the mobile telephone 10 (in which case there is no remote power feed by the reader 30) but can be reinitialized (step E200) as soon as the antenna 26 enters the electromagnetic field 26 of the reader 30.

The NFC module 24 then initiates communication with the reader 30, for example by sending it in the step E202 information indicating its presence in the field 36 of the reader 30. Communication can be initiated as described in the ISO 14443 standard, for example.

Thus in the step E204 the reader 30 detects the portable object 10 (which here is a mobile telephone) and consequently sends a command to it in the step E206. The command is an element of the implementation of the function that the user is seeking when they bring the telephone 10 close to the reader 30, as mentioned above. It is an APDU command according to the ISO 7816 standard, for example. Alternatively, the command need not itself participate in the function that the user is seeking but instead include as a parameter the application associated with the function that the user is seeking.

The telephone receives the command via the NFC link: the command passes through the NFC module 24 to the microprocessor 12 that is its destination.

Then in the step E208 the microprocessor 12 verifies if the code (for example the executable or interpretable code, i.e. the application) for executing this command (or part of this command, for example a subroutine) is stored in one of the memories 14, 16 (or possibly in a memory of the microcircuit card 22). The code (i.e. the application) is a series of independent instructions (in practice at least three instructions), stored in executable or interpretable form, for example, or even in the form of a source program to be compiled: these applications are for example formulated in the languages Javacard, Javascript, Java, assembler, C++.

This verification is effected, for example, by consultation of a table that contains, for each command that can be envisaged, an indicator of the presence of the application associated with that command in the memory of the mobile telephone 10 and, in the event that the application is present, its storage address.

It is equally possible in the embodiments described hereinafter to provide for storing in the same table, but this time with no application in the memory, data that is useful for obtaining the application (for example information to the effect that the application must be obtained from the reader 30 itself as in the present embodiment, or the coordinates of the server 50—for example a number usable by the cellular telephone system or an http address—with a view to downloading, as in the second embodiment described hereinafter with reference to FIG. 3).

If so, the microprocessor executes the application in order to execute the command as described hereinafter in the step E236.

If not, the microprocessor 12 prepares an application loading request and to this end first requests the microcircuit card module 22 to sign and encrypt this loading request (step E210).

The loading request includes a description of the command (such as a command number), for example, and possibly parameters such as elements describing the technical specifications of the mobile telephone 10 and possibly the http address of the server 50.

As already indicated, the loading request is sent to the microcircuit card 22 for signing and encryption (step E212) using a key stored in the microcircuit card and the microcircuit card 22 then sends the encrypted and signed request back to the microprocessor 12 (step E214).

The sending E216 and/or encryption of the request can be conditional upon verification (here by the card 22) of the presence of a right by the microcircuit card 22 and/or by an authorization (possibly with authentication) of the user of the mobile telephone 10, for example by selection of an item from a menu or pressing a particular key, or by entering and verifying a personal code (of PIN (Personal Identification Number) type).

Alternatively, the user can be requested to provide such authorization at the time of loading or installing the application.

Alternatively the operations of encryption and/or authentication of the user can be carried out by the mobile telephone 10 (instead of the microcircuit card 22).

The encrypted and signed request can then be sent over the NFC link (i.e. in practice via the NFC module 24) to the reader 30, which thus receives the encrypted and signed request in the step E218.

The reader 30 and primarily its control module 32 can thus in step E220 verify the signature in order to be sure of the identity of the object 10 (or of the microcircuit card 22 or the bearer of the object, and thus where appropriate verify authorization of the latter to receive the application) and decrypt the request, for example by means of a key associated with the private key stored in the microcircuit card 22 of the portable object 10.

Following the above operations, the control module 32 of the reader 30 can proceed to process the decrypted request and to this end obtains a copy of the application to be transmitted, for example by reading a storage device associated with the reader 30 (such as a hard disk connected locally or integrated into the reader 30) or by means of a connection to the server 50 mentioned above and holding the application (in which case the connection between the reader 30 and the server 50 is preferably a secure connection, especially if the connection between the reader 30 and the server 50 uses at least in part a public network such as the Internet). Note that in this latter case the reader 30 sending the encrypted and signed request directly to the server 50 can be envisaged instead and that verification of the signature and decryption are effected by the server 50.

In the embodiment described here, the copy of the application obtained by the reader 30 in the step E222 is moreover a version that has been encrypted and signed, for example using a private key held by the publisher of the application.

The encrypted and signed application is sent from the reader 30 to the mobile telephone 10 via the NFC link in the step E224 and the microprocessor 12 thus receives the encrypted and signed application via the NFC module 24 in the step E226. As already indicated, the application could instead be exchanged via other interfaces of the telephone 10 and the reader 30, for example high throughput wireless interfaces.

Then in the step E228 the microprocessor 12 sends the version of the application received to the microcircuit card module 22 for verification of the signature and decryption of the latter version.

In the step E230 the microcircuit card module 22 then proceeds to verify the signature (by means of the public key associated with the private key of the publisher of the application, and decrypts the version of the application received from the reader 30 by means of a secret key, the aforementioned keys being obtained by the microcircuit card 22 by connecting to a server, for example, via the Internet, for example, and stored in a memory of the microcircuit card 22 or the mobile telephone 10, for example a nonvolatile memory).

In the step E232 the microcircuit card module 22 sends back the decrypted application (when the signature has been verified, of course; if not, the application received is not executed).

Thus the microprocessor 12 receives the application from the microcircuit card module 22 and stores it in the random-access memory 14 (or alternatively in the microcircuit card 22), which enables it to be installed in the step E234, possibly with other, associated operations.

Alternatively the application can be installed (and thus in particular stored) in a nonvolatile memory of the mobile telephone. In this case a list of the applications installed in this way can be kept, for example in the telephone, with the date of the last use of each of them, for example in order to delete the application least recently when the memory space allocated is full and a new installation is required.

Thus the microprocessor 12 can execute the command requested by the reader 30 in the step E236 using the application that has just been received by the method described above ("no" response in step E208) or that is already stored in the mobile telephone 10 ("yes" response in step E208).

As indicated above, the command (or the application designated as a parameter in the command in the variant already referred to above) is part of the implementation of a function required by the user of the mobile telephone and in this context defines a particular exchange protocol between the reader 30 and the mobile telephone 10, for example.

In this context, the mobile telephone 10 sends back a response following on from execution of the command (or the application designated by it) to the reader 30 (step E238), which response the reader receives in the step E240.

Figure 3:
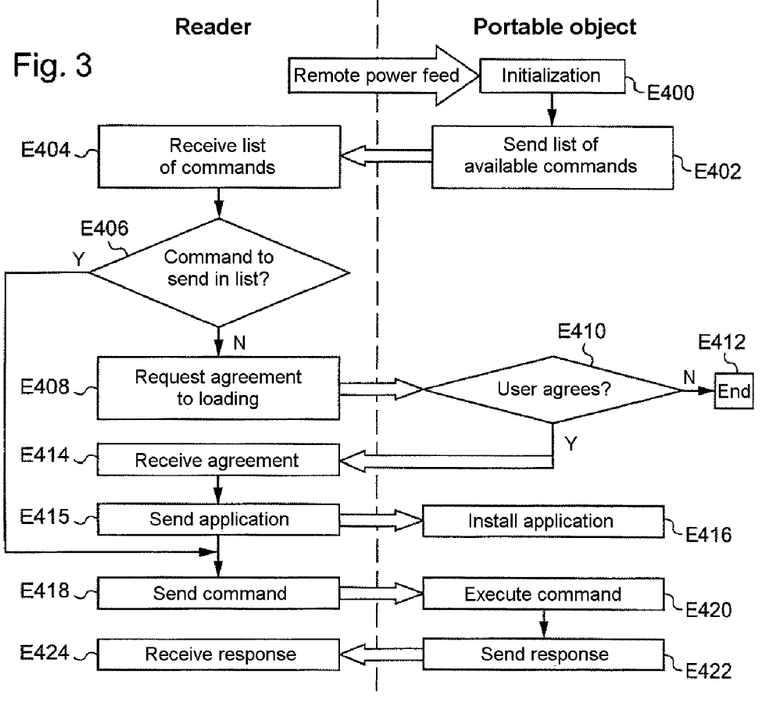
FIG. 3 represents the execution of such exchanges in a second embodiment of the invention.

FIG. 3 represents a second example of the method of exchanging data between the elements from FIG. 1.

As in the above example, communication between the portable object 10 and the reader 30 is engaged by virtue of the remote power feeding of the short range communication means of the portable object 10 as a result of moving the latter closer to the reader 30, which leads to initialization of communication between the portable object 10 and the reader 30 in the step E400.

In the example described here, the portable object then sends a list of commands available in the portable object (step E402) via these short range communication means. Note that the portable object 10 here sends the list of commands available without any prompting by the reader 30.

Alternatively, the list of commands available in the portable object 10 could be sent to the reader 30 only at the request of the reader 30, for example by the reader 30 sending a request for communication of the list or if the portable object 10 receives a command from the reader 30.

In the step E404 the reader 30 receives the list of commands or applications available in the portable object 10.

The reader 30 can then itself determine if a command or application intended for the portable object 10 is contained in this list of the commands available (step E406) or if an application necessary for execution of the command is contained in the list.

If so, the reader 30 can send the command to the portable object 10 (in the step E418 described hereinafter).

If not, the loading into the portable object 10 of the application corresponding to the command required by the reader 30 constitutes a preliminary step to sending this command and the reader 30 launches a process of loading the application from the step E408 onward, as described hereinafter.

Note that in a variant that can be envisaged the determination of the availability of the command in the portable object 10 could be effected by sending a request to the portable object, verifying the presence of the associated application in the portable object 10 as in the previous embodiments, and the portable object 10 sending the reader 30 information indicating the availability or non-availability of the command in the portable object 10.

As indicated above, if it is determined that loading of the application associated with a command is necessary before execution thereof, there follows the step E408 in which in the present embodiment the reader 30 sends the portable object 10 a request for agreement to such loading.

The portable object 10 receives this request for agreement and requests the agreement of the user, for example, as shown in the step E410 (typically by displaying a corresponding message for the attention of the user and awaiting a response from the user via a keypad of the portable object 10).

If the user refuses loading ("no" response in the step E410), communication between the reader 30 and the portable object 10 is terminated, for example, because a command from one to the other cannot be executed (step E412).

On the other hand, if the user agrees to loading ("yes" response in the step E410), for example by pressing a predetermined real or virtual key (menu) and/or by entering a personal code, the portable object 10 sends back to the reader 30 information indicating that agreement (step E414).

Note that requesting the user's agreement in the manner described above is one possible embodiment, but that other variants can be envisaged: in particular, the portable object 10 could agree to loading as a function of a parameter stored in the portable object 10 and indicating that such loading is authorized.

Alternatively the user's agreement could be requested before installing the application, i.e. immediately after the step E416 described below.

After reception of the agreement for loading in the step E414, the reader 30 proceeds to send the application associated with the command in the step E415, which application the reader 30 holds beforehand, for example on a local hard disk (or in any other storage means, such as a memory, for example) or is obtained via a connection (possibly a secure connection) to the remote server 50, as indicated above with reference to the first embodiment.

The application is then received by the portable object 10 in the step E416 and installed therein (i.e. primarily stored in a memory of the portable object 10, typically the memory 14).

Once the application has been sent in the step E415, and possibly after a time delay (or alternatively on reception of confirmation by the object 10 that the application has been installed), the reader can proceed to send the required command in the step E418.

The portable object 10 receives the command in the step E420 and executes it using the application in its memory (where appropriate because it was loaded in the step E415 as described above).

The result of executing this application is sent in the step E422 in the form of a response to the reader 30, which receive this information in the step E424.

The previous examples are only possible embodiments of the invention, which is not limited to them. In particular, a variant can be envisaged in which the mobile telephone equipped with the NFC module functions as the reader. Moreover, the features and variants of the various embodiments described hereinabove can be combined.

The invention claimed is:

1. A method of exchanging data between a first electronic entity (10) and a second electronic entity (30), comprising:
   upon detection at said first electronic entity that the first and second electronic entities (10, 30) are within a predetermined distance of each other, initiating communication between the first electronic entity (10) and the second electronic entity (30);
   at the second electronic entity and as a result of said initiating step, transmitting from the second electronic entity a command to the first electronic entity;
   at the second electronic entity and as a result of said initiating step, transmitting (E224; E415) to the first electronic entity an installation message for installing an application onto the first electronic entity (10), the installation message including the application therein and the installation message being different from said command, said application being capable of, upon execution on a processing unit of the first electronic entity, executing said command received from the second electronic entity;
   at the first electronic entity, and after receiving the installation message including the application from the second electronic entity, storing and installing (E234; E416) said application in a memory of the first electronic entity (10);
   at the processing unit of the first electronic entity, executing said application stored and installed in the memory of the first electronic entity;
   at the first electronic entity, by way of said application executing on said processing unit, executing the command received from the second electronic entity and determining a response to the command as output; and at the first electronic entity, sending said response to the second electronic entity, wherein, prior to the step of transmitting the installation message to the first electronic entity (10), a verifying step takes place that verifies that application code executable on the processing unit of the first electronic entity and capable of executing said command is not stored in the memory of said first electronic entity said verifying step comprises the sub-steps of:
at the first electronic entity (10), sending (E402) a list of commands executable by one or more applications currently stored in the memory of the first electronic entity; and
at the second electronic entity (30), determining (E406) whether said command is in said list.

2. The method according to claim 1, wherein said step of initiating communication comprises the sub-steps of:
energizing a wireless communication unit of the first electronic entity by remotely feeding power from the second electronic entity (30) to the first electronic entity (10); and
subsequent to said energizing step, sending a communication set-up message from the first electronic entity (10) to the second electronic entity (30).

3. The method according to claim 1, further comprising:
at the first electronic entity, prompting a user for agreement prior to the step of transmitting the installation message from the second electronic entity (E410),
wherein the installation message is transmitted in the event that the user responds to the prompting step with an agreement.

4. The method according to claim 1, wherein the steps of transmitting (E224; E415) the installation message and sending (E238; E422) the response are executed by short range communication means equipped at both the first and second electronic entities.

5. The method according to claim 1, wherein the steps of transmitting (E224; E415) the installation message are carried out by first and second high throughput wireless interfaces equipped respectively at the first and second electronic entities.

6. The method according to claim 1, wherein the application of the installation message relates to the second electronic entity.

7. The method according to claim 1, wherein the first electronic entity is a portable electronic entity.

8. The method according to claim 1, wherein communication between the first and second electronic entities is carried out by short range wireless communication.

9. The method according to claim 1, wherein, prior to said step of transmitting the installation message to the first electronic entity, said first electronic entity transmits to the second electronic entity a signed request, said signed request being signed by use of a microcircuit card provided in the first electronic entity.

10. The method according to claim 9, wherein the signed request is encrypted by use of said microcircuit card.

11. The method according to claim 1, wherein said installation message is transmitted from the second electronic entity in encrypted form to the first electronic entity.

12. The method according to claim 11, wherein the encrypted installation message is decrypted at the first electronic entity by a microcircuit card provided in the first electronic entity.

13. The method according to claim 1, wherein the communication between the first and second electronic entities is carried out by wireless communication.

14. The method according to claim 1, further comprising:
upon the application code capable of executing the command being verified as not present in the memory, retrieving data stored in said memory useful for retrieving an application capable of executing the command.

15. The method according to claim 1,
wherein said step of initiating communication takes place when the first electronic entity and the second electronic entity brought within a distance of less than 20 cm from each other,
wherein the command is an APDU command according to an ISO 7816 standard, and
wherein the application is formulated in any of Javacard, Javascript, Java, assembly language, and C++.

16. The method according to claim 1, further comprising:
at the first electronic entity, prior to said storing and installing step, determining whether the memory of the first electronic entity is too full for storing and installing the application of the installation message; and
in the event that the memory of the first electronic entity determined to be too full for storing and installing the application, deleting from the memory an application stored in the memory that is least recently used.

17. A method of exchanging data between a first electronic entity (10) and a second electronic entity (30), comprising:
upon detection at said first electronic entity that the first and second electronic entities (10, 30) are within a predetermined distance of each other, initiating communication between the first electronic entity (10) and the second electronic entity (30);
at the second electronic entity and as a result of said initiating step, transmitting from the second electronic entity a command to the first electronic entity;
at the second electronic entity and as a result of said initiating step, transmitting (E224; E415) to the first electronic entity an installation message for installing an application onto the first electronic entity (10), the installation message including the application therein and the installation message being different from said command, said application being capable of, upon execution on a processing unit of the first electronic entity, executing said command received from the second electronic entity;
at the first electronic entity, and after receiving the installation message including the application from the second electronic entity, storing and installing (E234; E416) said application in a memory of the first electronic entity (10);
at the processing unit of the first electronic entity, executing said application stored and installed in the memory of the first electronic entity;
at the first electronic entity, by way of said application executing on said processing unit, executing the command received from the second electronic entity and determining a response to the command as output; and
at the first electronic entity, sending said response to the second electronic entity,
wherein, at the first electronic entity and prior to said step of transmitting the installation message from the second electronic entity, a step takes place of transmitting a request to load said application from said first electronic entity to said second electronic entity,
said request comprising a description of the command, elements describing technical specifications of the first entity, and network location information of a third entity having the application stored thereon.

18. The method according to claim 17, wherein said step of initiating communication comprises the sub-steps of:

energizing a wireless communication unit of the first electronic entity by remotely feeding power from the second electronic entity (30) to the first electronic entity (10); and subsequent to said energizing step, sending a communication set-up message from the first electronic entity (10) to the second electronic entity (30).

19. The method according to claim 17, further comprising:

at the first electronic entity, prompting a user for agreement prior to the step of transmitting the installation message from the second electronic entity (E410), wherein the installation message is transmitted in the event that the user responds to the prompting step with an agreement.

20. The method according to claim 17, wherein communication between the first and second electronic entities is carried out by short range wireless communication.

21. The method according to claim 17, wherein said installation message is transmitted from the second electronic entity in encrypted form to the first electronic entity.

22. The method according to claim 21, wherein the encrypted installation message is decrypted at the first electronic entity by a microcircuit card provided in the first electronic entity.

23. The method according to claim 17, wherein said step of initiating communication takes place when the first electronic entity and the second electronic entity brought within a distance of less than 20 cm from each other, wherein the command is an APDU command according to an ISO 7816 standard, and wherein the application is formulated in any of Javacard, Javascript, Java, assembly language, and C++.

* * * * *